United States Patent [19]
Turin et al.

[11] Patent Number: 4,667,081
[45] Date of Patent: May 19, 1987

[54] APPARATUS FOR CHANGING THE DIRECTION OF A LIGHT BEAM PASSING THROUGH AN ARTICULATED JOINT

[75] Inventors: Paul S. Turin, Berkeley; Georg Teslawski; Dexter C. Tight, Jr., both of Menlo Park, all of Calif.

[73] Assignee: Spectra-Physics, Inc., San Jose, Calif.

[21] Appl. No.: 697,998

[22] Filed: Feb. 4, 1985

[51] Int. Cl.$^4$ ............................................. B23K 26/02
[52] U.S. Cl. ...................... 215/121 LV; 219/121 LC; 219/212 LU
[58] Field of Search ................. 219/121 LU, 121 LV, 219/121 LC, 121 LD, 121 FS, 121 LW, 121 L, 121 LM, 121 LG, 121 LN, 121 LH, 121 LJ

[56] References Cited

U.S. PATENT DOCUMENTS

| | | | |
|---|---|---|---|
| 3,597,578 | 8/1971 | Sullivan et al. | 219/121 LN X |
| 3,986,767 | 10/1976 | Rexer et al. | 219/121 LV X |
| 4,125,755 | 11/1978 | Plamquist | 219/121 LD |
| 4,144,888 | 3/1979 | Malyshev et al. | 128/303.1 |
| 4,413,180 | 11/1983 | Libby | 219/121 LV |
| 4,465,919 | 8/1984 | Röder | 219/121 LG |
| 4,533,814 | 8/1985 | Ward | 219/121 LV X |
| 4,563,567 | 1/1986 | Geffroy et al. | 219/121 LV X |
| 4,575,610 | 3/1986 | Gavin | 219/121 L |

OTHER PUBLICATIONS

Duane J. Schmatz, et al. Laser Focus, Applications in Automaking, Feb. 1975.

Primary Examiner—C. L. Albritton
Attorney, Agent, or Firm—Donald C. Feix; Paul Davis

[57] ABSTRACT

An articulated joint of changing the direction of a light beam passing through the joint has an inlet for the incoming light beam, an outlet for the outgoing light beam, two turning mirrors and three precision bearing units associated with the turning mirrors for permitting rotation of the mirrors with a minimum amount of error of angular displacement of the redirected beam. An apparatus providing movement of at least a portion of a beam delivery system and directing an outlet beam to a desired location includes the articulated joint, a motion delivery device operatively associated with the joint and connecting means disposed between the joint and the motion delivery device. The connecting means are adapted to provide relative motion between an attachment of the connecting means to the joint and an attachment of the connecting means to the motion delivery device. The precision bearings are associated with the turning mirrors and the outlet so as to decouple the articulated joint from the axis of the actuator mechanism, such as, for example, a robot arm. The precision bearing units incorporate two tapered roller bearings opposed to each other. Each tapered roller bearing has an inner race and an outer race. A preload arrangement preloads the bearings by exerting a force on the inner races which tends to squeeze the inner races together and by exerting a force on the outer races which tends to push the inner races apart.

23 Claims, 10 Drawing Figures

APPARATUS FOR CHANGING THE DIRECTION OF A LIGHT BEAM PASSING THROUGH AN ARTICULATED JOINT

BACKGROUND OF THE INVENTION

This invention relates to a beam delivery system of the kind used for delivering a laser beam from a laser to a target in conjunction with and under the control of a motion delivery device such as a robot arm.

The present invention relates particularly to an improvement in an articulated joint used with such a beam delivery system, to precision bearing units associated with optical elements in such articulated joints, and to an apparatus providing movement of at least a portion of the beam delivery system to direct the outlet beam to the desired location.

This application also relates to improvements in a beam delivery system of the kind disclosed in copending U.S. application Ser. No. 577,343 filed Feb. 6, 1984 by Joseph F. Rando and Henry W. Jones and entitled "BEAM DELIVERY SYSTEM FOR A $CO_2$ LASER" and assigned to the same assignee as the assignee of this application. The copending application Ser. No. 577,343 filed Feb. 6, 1984 is incorporated by reference in this application in accordance with the provisions of the *Manual of Patent Examining Procedure*, Section 608.01(p)B.

The present application is directed particularly to an articulated joint for changing the direction of a light beam passing through the joint, as well as an apparatus providing movement of at least a portion of the beam delivery system to direct the outlet beam to the desired location.

In the present application the joint is illustrated and disclosed as a wrist joint component of a beam delivery system which is used to deliver a beam of laser light from a laser mounted in a fixed position to any one of a number of target locations as determined by the movement of a robot arm associated with the beam delivery system. The articulated joint of the present invention is not, however, limited to use in such a robot arm controlled beam delivery system but can instead be used in a variety of other applications. The articulated joint of the present invention is usable in any application which requires movement of an outlet (for an outgoing beam) in any or all of three degrees of freedom of mechanical movement with respect to an inlet (for the incoming beam) and in which the entire articulated joint is also movable within a swept volume in any or all of three degrees of freedom of mechanical movement. The articulated joint of the present invention can for example be actuated and controlled by a three dimensional cam, by rotary stages and XY stages or by other mechanisms different from a robot arm.

The present invention also has particular application to a precision bearing construction usable in the wrist joint and usable also in other applications in which it is necessary to hold an optical element, such as, for example, a mirror block, in a precise location with respect to a light beam associated with the optical element.

Furthermore, the present invention has particular application to a complete apparatus which includes the articulated joint and a motion delivery device, coupled together with a connector adapted to provide relative motion between the attachment to the articulated joint and the attachment to the motion delivery device.

SUMMARY OF THE INVENTION

In one specific embodiment of the present invention an articulated joint for changing the direction of a light beam passing through the joint comprises an inlet for the incoming light beam and an outlet for the outgoing light beam. The articulated joint includes a first mirror block having a first turning mirror for receiving the incoming beam through the inlet and for redirecting the incoming beam. The wrist joint also includes a second mirror block having a second turning mirror for receiving the redirected beam from the first turning mirror and for redirecting the beam through the outlet.

The first and second turning mirrors are the only turning mirrors used or required in the wrist joint of the present invention.

In one embodiment of the present invention, the wrist joint incorporates three precision bearings which are specially constructed in accordance with the present invention for maintaining precise positioning of the turning mirrors associated with the mirror blocks and which substantially eliminate wobble of the light beam passing through the wrist joint.

One precision bearing is located between the inlet and the first mirror block.

The second precision bearing is located between the first mirror block and the second mirror block.

The third precision bearing is located between the mirror block and a face plate used for connecting the wrist joint to an actuator, such as, for example, the end of a robot arm or a cam follower of a three dimensional cam assembly.

The third precision bearing unit (connecting bearing) is located on a side of the second mirror block opposite that having the outlet of the wrist joint. The axis of rotation of the precision bearing is aligned with the optical axis of the outlet. This location and alignment of the third precision bearing decouples the beam delivery system of which the wrist joint forms a component part from the orientation of the attaching points on the motion delivery system, in one embodiment a robot faceplate. This in turn eliminates the need for a third mirror in the wrist joint and also reduces the likelihood of "lock-up" of the wrist joint (and/or "lock-up" of the beam delivery system of which the wrist joint forms a component part) during operation of the robot arm or other actuator mechanism with which the wrist joint is operatively associated.

In greater detail, to position and orient the outlet beam in a previous three-mirror wrist apparatus, the motion delivery system operatively associated and rigidly attached to the third wrist mirror block delivered a torque to the mirror block which could be broken into three components of torque about three orthogonal axes. In order to accommodate these three components of torque (i.e., prevent excessive forces on the rest of the beam delivery system) bearings were used between the blocks of the wrist with an axis of rotation in line with the incoming beam. The second bearing was disposed between the first and second mirror blocks of the wrist. The third bearing was disposed between the second and third mirror blocks of the wirst.

The present invention provides a two-mirror/two-mirror block wrist, articulated joint. A connecting bearing is positioned between the motion delivery device and the second mirror block of the wrist (the block from which the outlet beam emerges). With this new configuration the motion delivery system exerts only two orthogonal components of torque on the block. The connecting bearing rotates to eliminate the third component of torque. Since there are only two components of torque applied to the mirror block, only two additional bearings are required to accommodate the torque. Thus only one additional mirror block is required.

With the previous three-mirror wrist, articulated joint there was a configuration of the three blocks where the forces of the torque could cause serious damage to the beam delivery system. This configuration, termed "lock-up", occured when the axes of the first and third bearings of the wrist cam close to parallel. As a result, the system could accommodate only two components of torque and a third component would cause excessive forces. This "lock-up" configuration could occur in an infinite number of combinations.

With the present invention, "lock-up" will occur only when the first bearing axis (the one before the first block of the wrist) is parallel to the connecting bearing axis. These configurations are very rarely encountered.

Advantageously, the present invention improves upon the three-mirror wrist, articulated joint in that it eliminates a mirror block, increases the alignment accuracy of the beam delivery system, weighs less, significantly reduces the problem of "lock-up", increases the ease of programming the motion delivery system, and allows for the use of simpler motion system configurations (e.g., a five-axis articulated robot vs. a six-axis robot).

The precision bearings of the present invention permit rotation of a beam redirecting mirror about an axis aligned with the axis or rotation of the bearing with a minimum amount of error of angular displacement of the redirected beam. Each precision bearing unit comprises two tapered roller bearings opposed to each other. Each tapered roller bearing has an inner race and an outer race. The precision bearings are constructed to incorporate a preload arrangement for preloading the bearings by exerting a force on the inner races which tends to squeeze the inner races together and by exerting a force on the outer races which tends to push the inner races apart. A custom made spacer is located between the inner races. The spacer has a thickness which gives the exact proper preload.

Articulated joint and precision bearing methods and apparatus which incorporate the structures and techniques described above and which are effective to function as described above constitute further, specific objects of this invention.

In yet another aspect of the present invention, an apparatus is disclosed which provides movement of at least a portion of the beam delivery system and directs the outlet beam to the desired location. The apparatus comprises an articulated joint including an inlet for an incoming light beam and an outlet for an outgoing light beam. Mirror means, having at least two mirrors, are included for receiving the incoming beam from the inlet and redirecting the outgoing beam through the outlet. A motion delivery device is operatively associated with the articulated joint to provide motion in any or all of three degrees of freedom. Connecting means are disposed between the articulated joint and the motion delivery device. The connecting means are adapted to provide relative motion between an attachment of the connecting means to the articulated joint, and an attachment of the connecting means to the motion delivery device.

In a further aspect of the invention, the connecting means between the motion delivery system and the beam delivery system includes means for compensating movement in the event of a collision between the beam delivery system and an obstacle or other significant force built up between the beam delivery system and the motion delivery system. This motion can be detected with a proximity switch or other device.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is an isometric view showing a beam delivery system which is associated with a robot for use on an automobile assembly line. The beam delivery system shown in FIG. 1 incorporates an articulated joint (constructed in accordance with one embodiment of the present invention) for changing the direction of a laser beam passing through the joint. In the beam delivery system shown in FIG. 1 the articulated joint is a wrist joint which is shown in more detail in FIGS. 5 and 10. The beam delivery system shown in FIG. 1 also incorporates precision bearing units which are shown in more detail in FIGS. 7-9.

FIG. 4 shows, in dashed outline, how the component parts of the beam delivery system are moveable in the course of operation of the robot shown in FIG. 1.

FIG. 5 is taken along the line and in the direction indicated by the arrows 5—5 in FIG. 1.

FIG. 7 shows details of construction of the precision bearing which is indicated by the parentheses and the number 7 in FIG. 5.

FIG. 10 shows an articulated joint corresponding to the wrist joint shown in the top part of FIG. 3.

DESCRIPTION OF THE PREFERRED EMBODIMENTS

The present invention is an articulated joint adapted to change the direction of a light beam passing through the joint. Furthermore, the invention is an apparatus providing movement to at least a portion of a beam delivery system to deliver the output beam to the desired location. The apparatus includes the articulated joint comprising an inlet for an incoming beam and an outlet for the outgoing beam. Mirror means defining at least two mirrors receive the incoming beam from the inlet and redirect it as an outgoing beam through the outlet. A motion delivery device is operatively associated with the articulated joint and provides motion to the articulated joint in any or all of three degrees of freedom. Connecting means connect the articulated joint to the motion delivery device. The connecting means are adapted to provide relative motion between the attachment to the articulated joint and the attachment to the motion delivery device. Relative motion is defined herein as motion in one or more degrees of freedom of the attachment points to the beam delivery system with respect to the attachment point of the motion delivery system. The preferred relative motion is a single degree of freedom of rotation about an axis. Another example of relative motion allows for compensation movement in the event of a collision between a beam delivery system and an obstacle.

Many motion delivery devices are suitable for the purposes of the present invention. Such devices include but are not limited to a robot with an actuator arm, a three dimensional cam surface with cam follower, rotary stage means and X-Y stage means, and the like. The preferred device is a robot.

Figure 1:
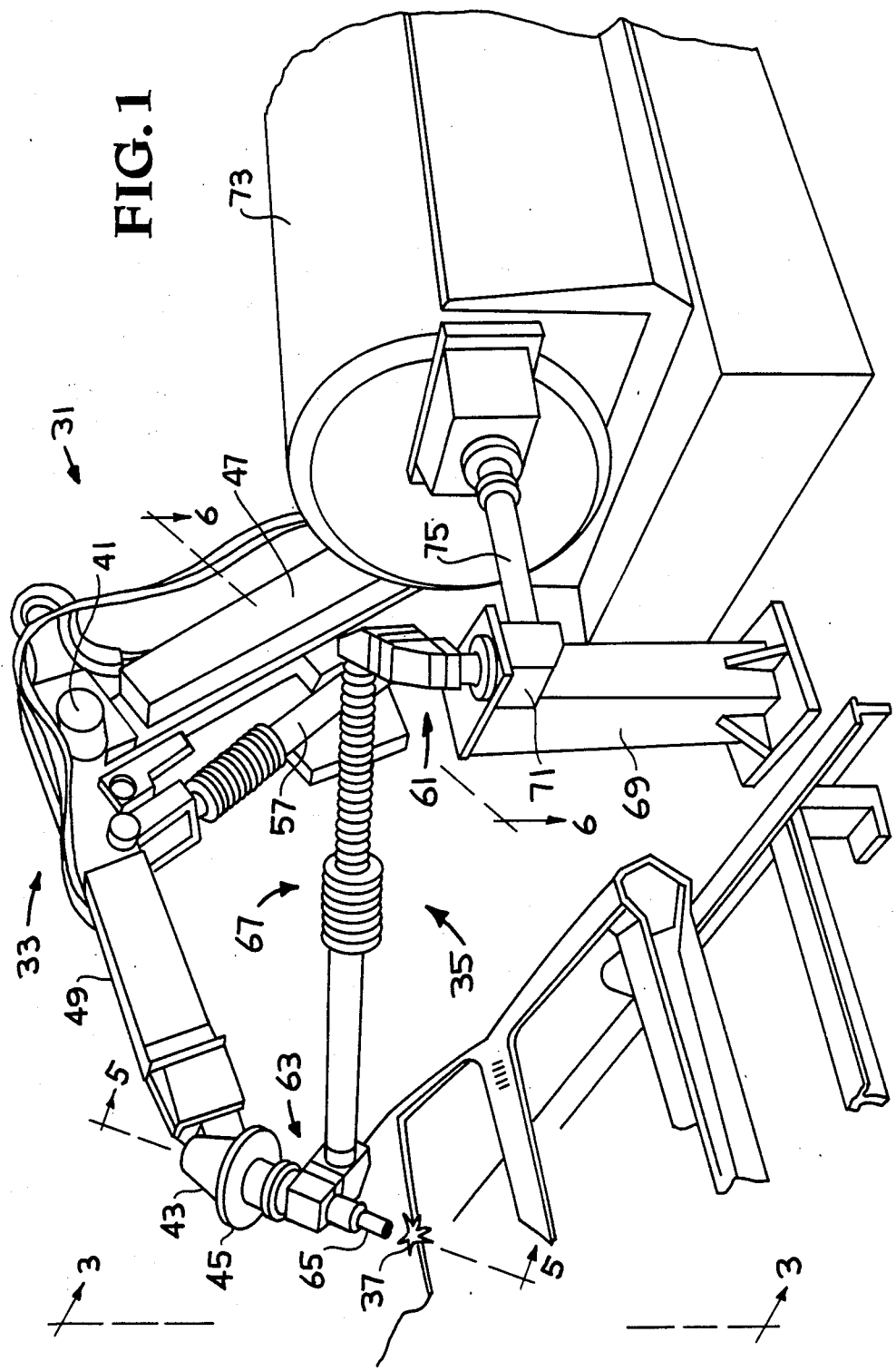

A beam delivery system and associated robot arm are indicated generally by the reference numeral 31 in FIG. 1 which is an isometric view showing how the beam delivery system is associated with the robot arm for use on an automobile assembly line.

The robot is a mechanical system which is indicated generally by the reference numeral 33, and the beam delivery system associated with the robot 33 is a mechanical-optical system which is indicated generally by the reference numeral 35 in FIG. 1.

The combined robot-beam delivery system 31 as shown in FIG. 1 is used to transmit a high powered, focused laser beam to certain target locations, such as the illustrated target 37 shown in FIG. 1, on the automobile assembly line as the assembly line moves past the robot and beam delivery unit 31.

The beam delivery system 35 of the present invention is an improvement over the beam delivery system shown in copending U.S. application Ser. No. 577,343 filed Feb. 6, 1984 by Rando et al and assigned to the same assignee as the assignee of this application; and copending U.S. application Ser. No. 577,343 filed Feb. 6, 1984 is incorporated in this application by reference in accordance with the *Manual of Patent Examining Procedure,* Section 608.01(p)B.

The robot 33 comprises a robot base (which is not shown in FIG. 1 but which is indicated by the reference number 32 in FIG. 4), a shoulder joint mechanism (which also is not shown in FIG. 1), an elbow joint 41, a wrist joint 43 having a face plate 45 for mounting a wrist joint of the beam delivery system 35 (as will be disclosed in more detail below) a link 47 connecting the shoulder joint to the elbow joint, a link 49 connecting the elbow joint 41 to the wrist joint 43, and an actuator 51 connected to the link 49 as illustrated in FIG. 1.

The robot arm 33 is an articulated mechanism which is capable of moving the face plate 45 to any point in space within the swept volume of the robot arm and which is also capable of adjusting the angle of the face plate 45 in any or all of three degrees of freedom of mechanical movement within the limits of the ranges of such movement as incorporated in the robot arm mechanism 33.

The beam delivery system 35 comprises a shoulder joint 61, a wrist joint 63, a nozzle 65 connected to the outlet of the wrist joint 63, and a set of telescoping tubes 67 connecting the wrist joint 63 to the shoulder joint 61.

The component parts and the construction and function of the wrist joint 63 and the shoulder joint 61 will be described in more detail below with reference to later figures of the drawings.

The shoulder joint 61 is mounted on a fixed pedestal 69.

A mirror block assembly 71 is also mounted on the pedestal 69 and below the shoulder joint 61. The mirror block assembly 71 receives a laser beam from a laser beam generator unit 73 through a tube 75 and redirects the laser beam from the tube 75 into the inlet end of the shoulder joint 61.

As in the beam delivery system shown in the above noted copending U.S. application Ser. No. 577,343 filed Feb. 6, 1984, the beam delivery system 35 of the present invention is a self-contained, adaptable beam delivery system which can be used with a number of different robot arms and which can be readily interchanged from one arm to another type of arm because the beam delivery system 35 is not confined to the specific articulated construction of any particular robot arm.

As will also become more apparent from the description to follow, the wrist joint 63 has a construction and a mode of operation which permits the joint 63 to be used as an articulated joint with mechanisms other than robot arms.

Figure 3:
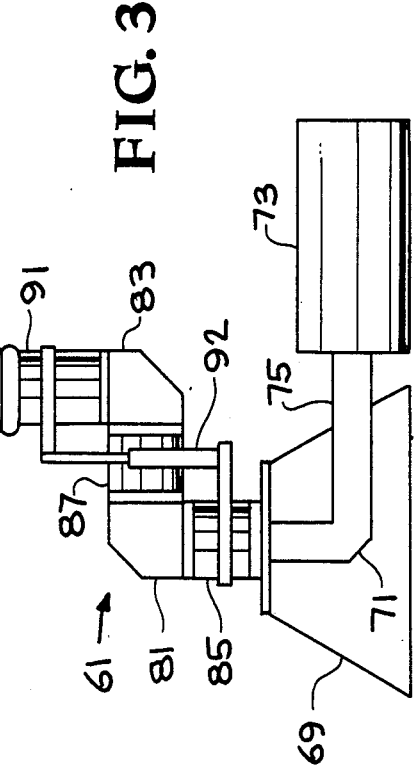
FIG. 3 is an elevation view which is taken generally along the line and in the direction indicated by the arrows 3—3 in FIG. 1.

Referring now to FIG. 3, the shoulder joint 61 includes a first mirror block 81 and a second mirror block 83.

Figure 9:
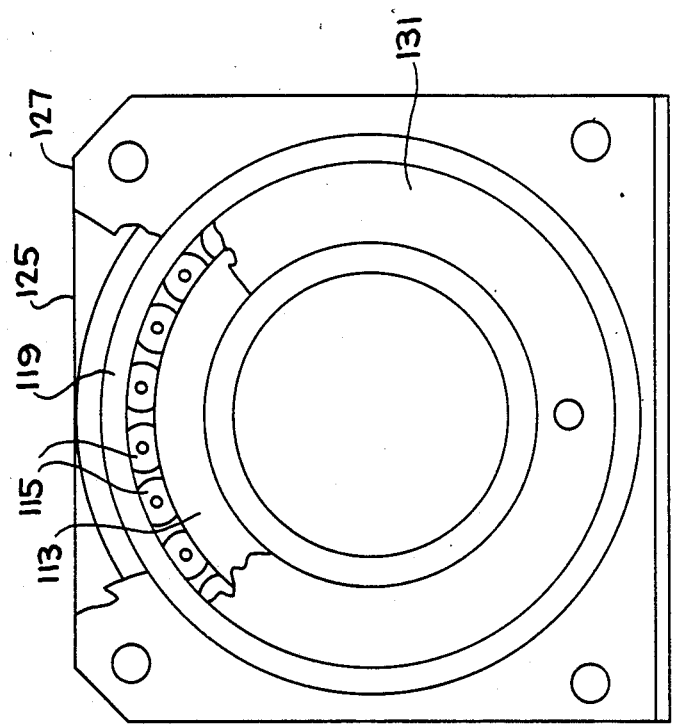
FIG. 9 is an end elevation view and is taken generally along the line and in the direction indicated by the arrows 9—9 in FIG. 8. Portions of FIG. 9 have been broken away to illustrate the construction.

A precision bearing 85 (having the construction that will be described in more detail below with references to FIGS. 7, 8 and 9) is located between the mirror block 81 and the pedestal 69 for permitting rotation of the mirror block 81 about the axis of rotation of the bearing 85.

A precision bearing 87 is located between the mirror block 81 and the mirror block 83 and permits the relative rotation of these two mirror blocks with respect to one another about the axis of the bearing 87. The precision bearing 87 is constructed like the precision bearing 85.

The mirror block 83 is connected to an outer telescoping tube 91 of the telescoping tube set 67.

A counter balance gas spring unit 92 may preferably be used between the bearing 85 and the tube 91 as illustrated in FIG. 3.

The wrist joint 63 has a first mirror block 93 and a second mirror block 95.

The wrist joint 63 also has three precision bearings which are like the precision bearings 85 and 87 of the shoulder joint 61.

In the wrist joint 63 a precision bearing 97 is located between the inner telescoping tube 99 of the telescoping tube set 67 and the first mirror block assembly 93. The precision bearing 97 permits rotation of the mirror block 93 with respect to the inner telescoping tube 99 about the axis of rotation of the bearing 97.

A precision bearing 101 is located between the mirror block 93 and the mirror block 95 and permits relative rotation of these two mirror blocks about the axis of rotation of the precision bearing 101.

A connecting precision bearing 103 is located between the face plate 45 of the robot arm and the mirror block 95 and permits rotation of the mirror block 95 with respect to the face plate 45 about the axis of rotation of the precision bearing 103.

Each of the precision bearings 97, 101 and 103 has a construction which is like the construction of the precision bearings 85 and 87 of the shoulder joint; and, as noted above, the specific construction of each of these precision bearings will be described in more detail below with reference to FIGS. 7, 8 and 9 of the drawings.

Figure 2:
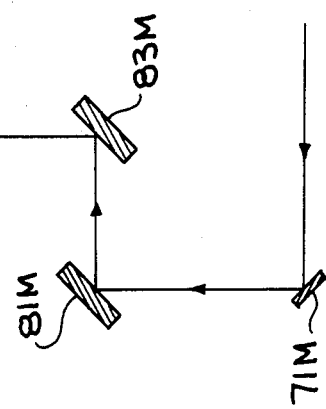
FIG. 2 is a diagramatic view tracing the path of a laser light beam through the beam delivery system shown in FIG. 1 and in FIG. 3.

FIG. 2 is a diagramatic view illustrating the path of the light beam going through the beam delivery system 35 of the present invention. As illustrated in FIG. 2 the beam from the laser unit 73 is redirected by a mirror element 71M in the mirror block assembly 71 and is directed to a turning mirror 81M in the mirror block assembly 81. The turning mirror 81M redirects the light beam to a turning mirror 83M in the mirror block assembly 83. The turning mirror 83M redirects the light beam to a turning mirror 93M in the mirror block 93 of the wrist joint. The turning mirror 93M redirects the light beam to a second turning mirror 95M in the mirror block assembly of the wrist joint. The turning mirror 95M redirects the light beam through a focusing lens assembly 65L of the nozzle, and the focusing lens assembly focuses the light beam on the target 37.

Figure 4:
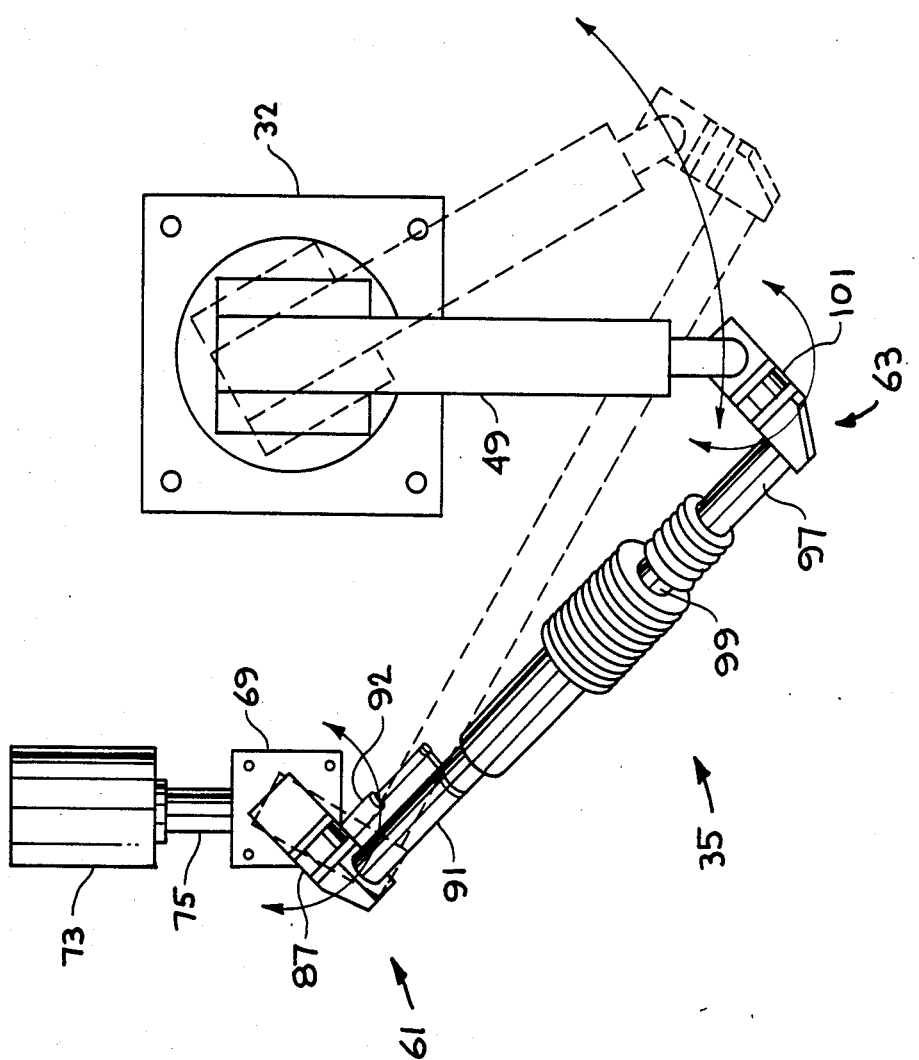
FIG. 4 is a bottom plan view which is taken generally along the line and in the direction indicated by the arrows 4—4 in FIG. 3.

FIG. 4 shows how the beam delivery system 35 is movable from the position shown in solid outline in FIG. 4 to a different position as shown by the phantom outline in FIG. 4.

As can be appreciated from a review of FIGS. 1 and 4, the wrist joint 63 of the present invention must be capable of permitting the nozzle 65 to be moved anywhere within the swept volume of the robot arm 33 and to any angle as determined by the angle of the face plate 45 without lockup between the robot arm 33 and the beam delivery system 35.

The location of the precision connecting bearing 103 with respect to the face plate 45 and the optical axis of the nozzle 65 is an important feature of the invention because it decouples the axis of the robot arm from the articulated wrist joint 63, as will be become more apparent from the description as follows.

Precision connecting bearing 103 is positioned between the mmotion delivery device (in FIG. 5 the face plate 45) and the second mirror block 95 of the wrist 63. With this configuration the motion delivery device exerts only two orthogonal components of torque on the block 95. Since there are only two components of torque applied to block 95, only two additional bearings 101 and 97 (shown in FIG. 3) are required to accommodate the torque. Only one additional mirror, e.g., block 93, is required.

With the present invention, "lock-up" occurs only when the axis of rotation of bearing 97 is parallel to the axis of rotation of connecting bearing 103. This configuration rarely occurs.

Figure 5:
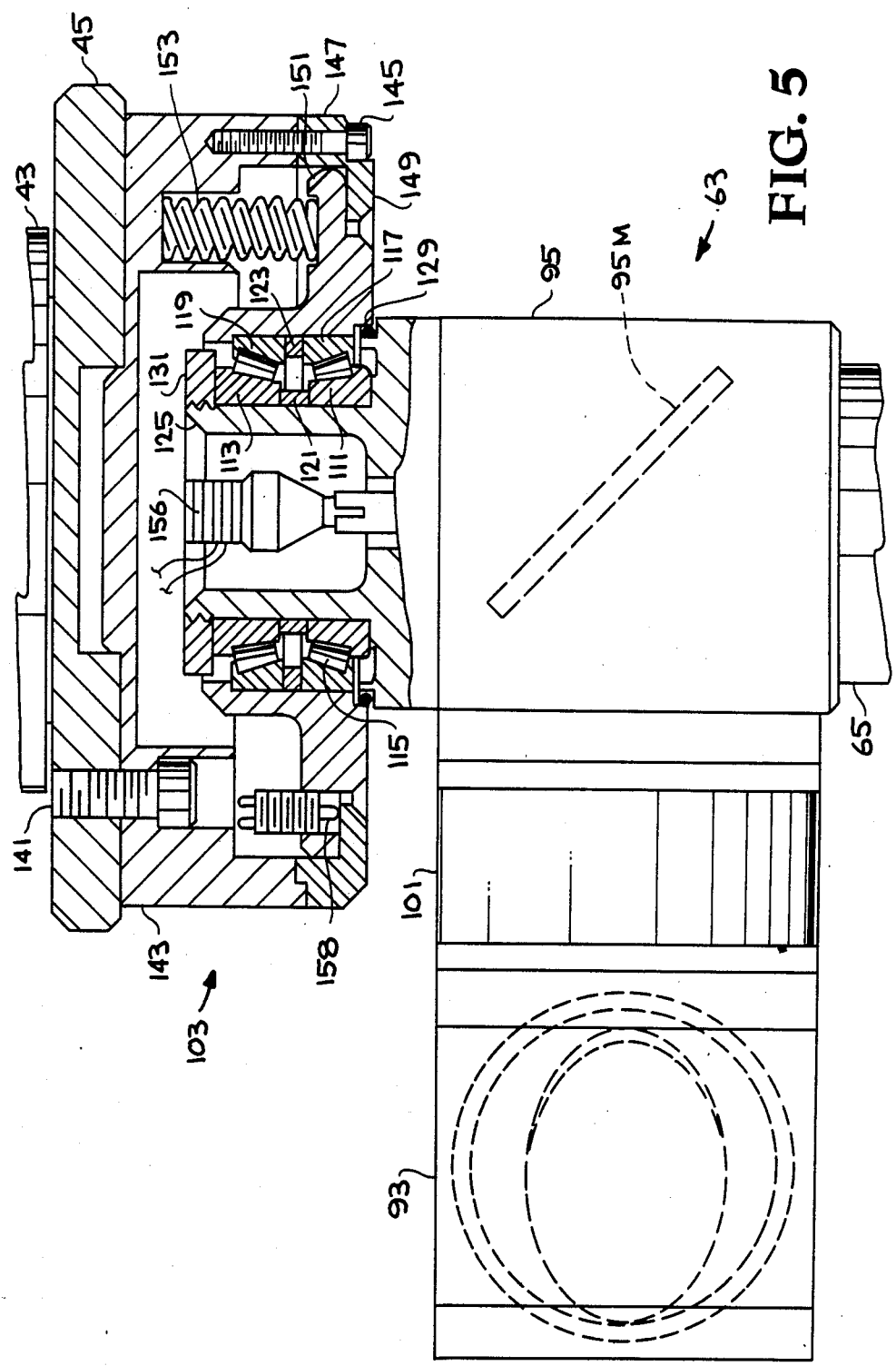
FIG. 5 is a fragmentary, enlarged view which is partly broken away to show details of construction of an articulated joint constructed in accordance with one embodiment of the present invention.

In FIG. 5 the precision connecting bearing 103 is shown partly broken away to show details of construction and also to show how the bearing is attached to the face plate 45. The basic construction of the bearing 103 is like that of the bearing 101 and is shown in more detail in FIGS. 7, 8 and 9.

Each precision bearing unit of the present invention incorporates two tapered roller bearing cone assemblies. These are the cone assemblies 111 and 113 shown in FIG. 7. Each cone assembly comprises an inner race and a number of tapered roller bearing elements 115.

The tapered roller bearing elements 115 provide a line contact, rather than a point contact like a ball bearing element, and such line contact provides substantially increased stability and rigidity over the point contact which would be provided by a ball bearing element. This increased strength and rigidity provided by the increased bearing element contact is quite important in achieving the required alignment of the optical components of the beam delivery system 35 of the present invention.

Figure 7:
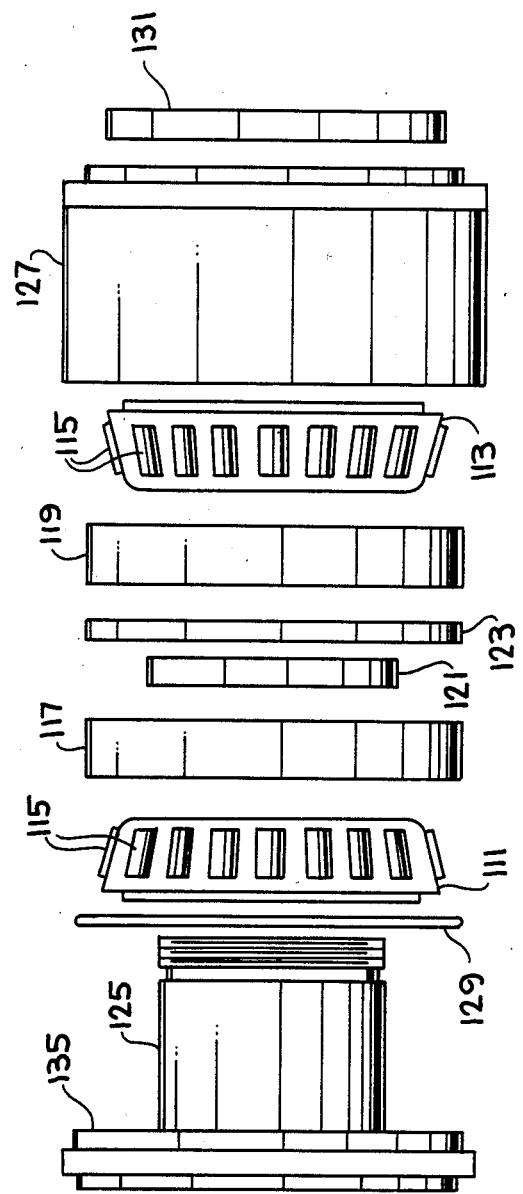
FIG. 7 is an exploded view showing components of a precision bearing unit constructed in accordance with the present invention.
Figure 8:
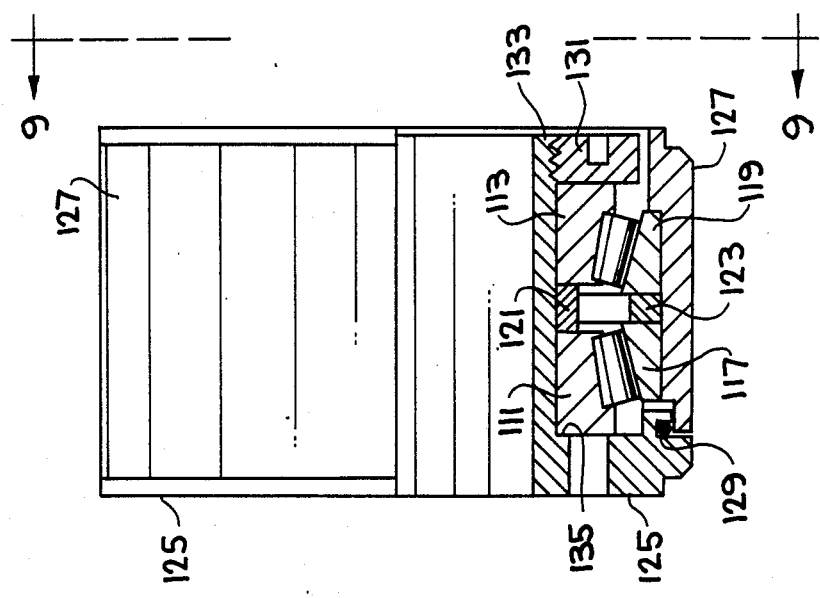
FIG. 8 is a side elevation view, partly broken away to show details of construction, of the precision bearing unit of FIG. 7 as assembled.

As illustrated in FIG. 7 and as also illustrated in FIG. 8, the bearing cone 111 is mounted in opposition to the bearing cone 113. The respective bearing cones 111 and 113 function as inner races. The inner race 111 has an associated outer race 117. The inner race 113 has an associated outer race 119.

The inner races 111 and 113 are separated by an inner spacer 121, and the outer races 117 and 119 have an outer spacer 123 located between the outer races.

Each precision bearing has an inner hub unit like the unit 125 shown in FIG. 7 and a housing unit like the unit 127 shown in FIG. 7.

An O ring seal 129 is associated with the inner hub 125 as illustrated.

A locking ring 131 is associated with the inner hub unit 125 and the housing unit 127 to lock the precision bearing in the assembled condition.

As illustrated in FIG. 8, the locking ring 131 acts in conjunction with the hub unit 125 to exert a preload on the bearing assembly which tends to squeeze the inner races 111 and 113 together and which exerts a force on the outer races 117 and 119 which tends to push the inner races apart.

This happens, because, as viewed in FIG. 8, turning the lock ring 131 in by means of the threads 133 pushes the inner race 113 to the left (as viewed in FIG. 8) and against the inner spacer 121 which in turn tends to push the inner race 111 up against the shoulder 135 of the inner hub 125.

The inner spacer 121 is a custom made spacer which has a thickness dimensioned to give the exact proper preload for the precison bearing assembly.

The exact preload is obtained by determining the space available between the inner races. Inner spacer 121 is configured to fit this space and limits the amount of preload.

Each precision bearing 85, 87, 97, 101 and 103 has the opposed tapered roller bearing construction and preload arrangement described above with respect to FIGS. 7, 8 and 9.

This axially compact, opposed, tapered roller bearing construction having the inner and outer race preloading arrangement as illustrated and described is effective to substantially eliminate wobble of a beam passing through optical elements of the beam delivery system of the present invention. This is significant and beneficial and is particularly important when the light beam is a high powered laser beam that needs to be precisely targeted.

With reference again to FIG. 5, it can be seen that the precision connecting bearing 103 is mounted on the face plate 45 by means of cap screws 141 which are used to connect an adapter plate 143 to the face plate 45, and by cap screws 145 which are used to connect a retainer ring 147 to the adapter plate 143. The retainer ring 147 has a lip 149 which engages a corresponding flange 151 of the outer housing 127 to press that outer housing down against coiled springs 153 as illustrated in FIG. 5.

In the event of a collision or other force exerted on the mirror block 95 relative to the face plate 45, the coiled springs 153 allow for a compensation movement of the flange 151 relative to the lip 149 and retainer ring 147.

The rotary contact switch 156 allows for electrical contact while enabling rotational motion of the connecting bearing 103 and is operatively associated with three proximity switches 158 (one shown) and a power supply (not shown). Each proximity switch 158 is located at a distinct location in connecting bearing 103 to sense motion of flange 151. When flange 151 is raised up or down, due to a collision with an obstacle or other significant force built up by the beam delivery system and the motion delivery system, a proximity switch 158 sends a signal to laser beam generator unit 73 (FIG. 1) and the motion delivery system (robot 33 in FIG. 1). This signal diasables the robot and laser to prevent damage and breakage.

Figure 6:
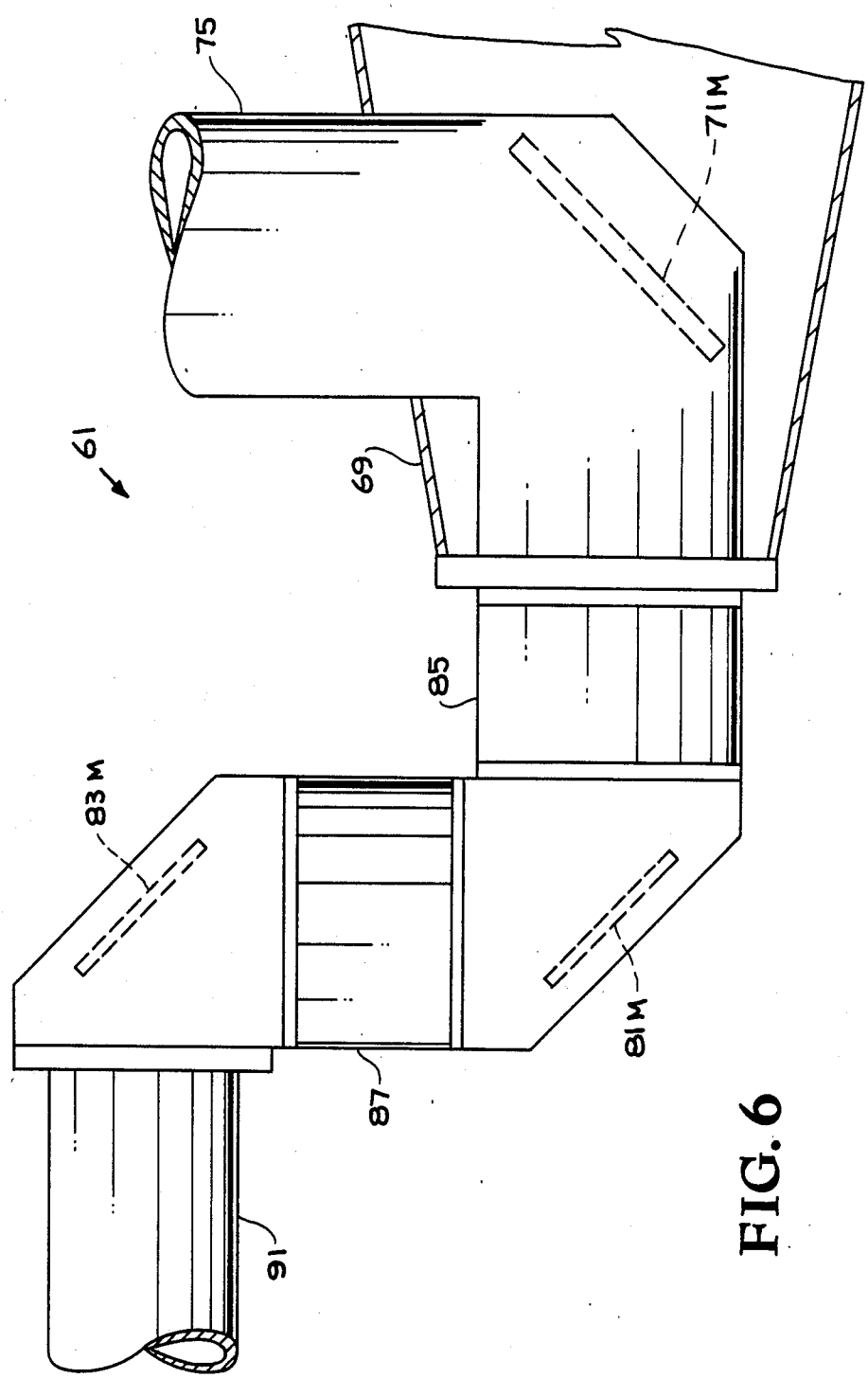
FIG. 6 is a fragmentary, enlarged view of a shoulder joint of the beam delivery system shown in FIG. 1 and is taken along the line and in the direction indicated by the arrows 6—6 in FIG. 1. The shoulder joint of FIG. 6 incorporates precision bearing units constructed in accordance with the present invention.

FIG. 6 is an enlarged view of the shoulder joint 61, shown in FIG. 1 and in FIG. 3.

While the present invention has been described in reference to a robot system, the articulated joint 63 is also useful with other mechanisms. This articulated joint 63 permits the outlet nozzle 65 to be moved in three degrees of mechanical freedom with respect to the inlet tube 99 while the entire articulated joint 63 is also being repositioned in space with three degrees of freedom of mechanical movement.

The movement of the articulated joint 63 may be produced by any one of a number of actuators, such as, for example, cam mechanisms, rotary stages and XY stages.

Figure 10:
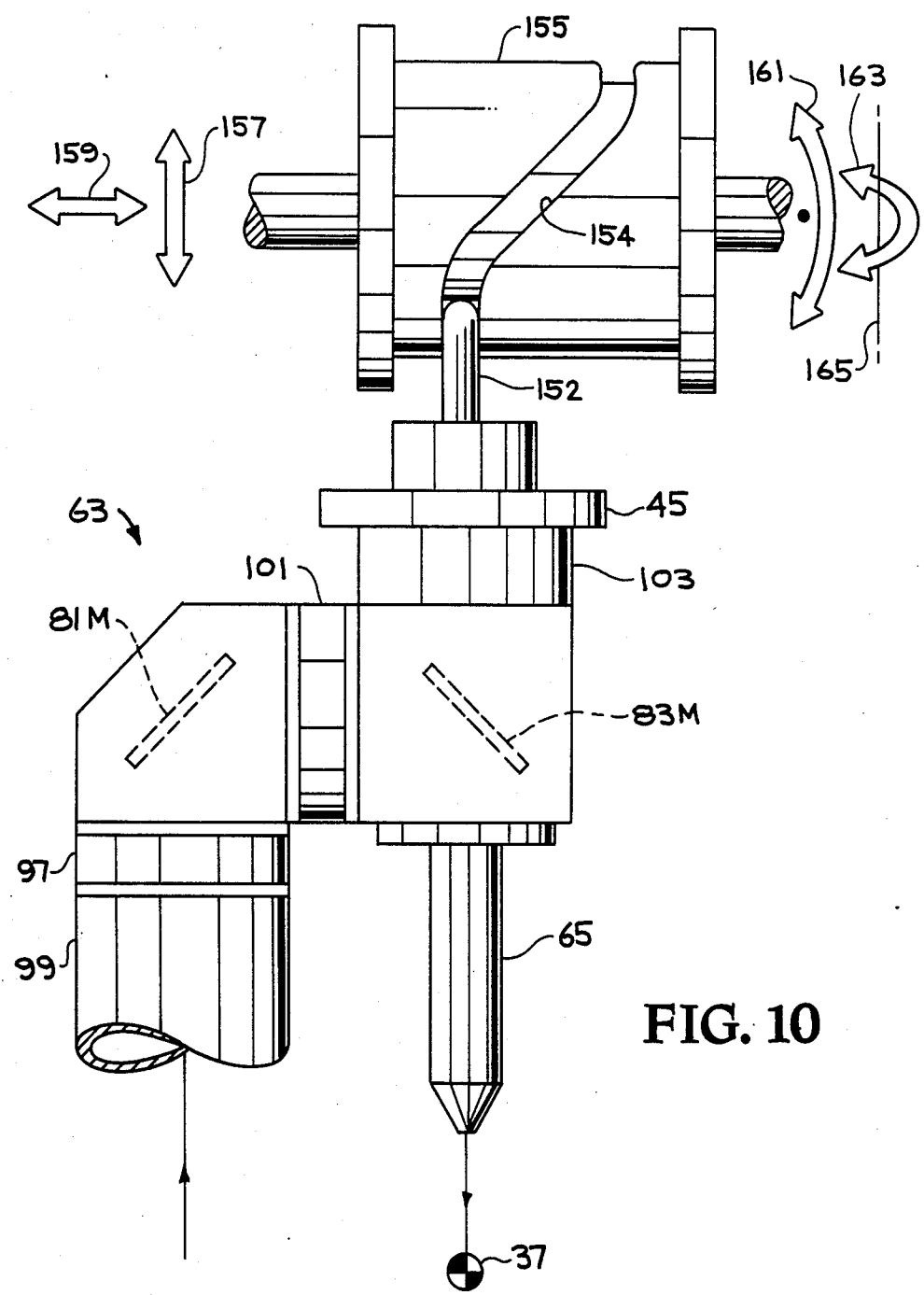
FIG. 10 is a fragmentary, enlarged view showing an embodiment of an articulated joint constructed in accordance with the present invention but positioned by a cam and cam follower unit rather than the end of a robot arm.

FIG. 10 shows a construction in which a cam follower element 152 is connected to a face plate 45 like the face plate 45 shown in FIG. 5. The cam follower element 152 is repositioned in two directions by a cam track 154 in a rotary cam element 155, and the entire rotary cam element 155 can be moved as indicated by the block arrows 157 and 159 in FIG. 10.

The three dimensional cam 155 can also be moved in a direction at right angles to the direction indicated by the arrows 157 and 159 (that is in a direction perpendicular to plane of the drawing of FIG. 10 as viewed in FIG. 10).

The cam 155 can also be swung and tilted in directions indicated by the block arrows 161 and 163 as illustrated in FIG. 10. The tilting of the cam 155 (as indicated by the block arrow 161) is about an axis extending perpendicular to the plane of the paper in FIG. 10, and the swinging of the three dimensional cam 155 is about an axis 165 extending within the plane of the paper in FIG. 10.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. An articulated joint for changing the direction of a light beam passing through the joint, said joint comprising, an inlet for the incoming light beam,
   an outlet for the outgoing light beam,
   first turning mirror means,
   second turning mirror means,
   first bearing means operatively associated with the inlet and with the first turning mirror means for permitting rotation of the first turning mirror means about an axis aligned with the axis of the inlet,
   second bearing means operatively associated with the first turning mirror means and the second turning mirror means for permitting rotation about an axis aligned with the direction of the beam as redirected from the first turning mirror means to the second turning mirror means,
   third bearing means operatively associated with the second turning mirror means for permitting rotation of the second turning mirror means about an axis aligned with the direction of the beam as redirected by the second turning mirror means, and
   actuator means operatively associated with the articulated joint through the third bearing means for moving the outlet in any or all of three degrees of freedom of mechanical movement with respect to the inlet.

2. The invention defined in claim 1 wherein the actuator means include the end of an actuator arm of a robot and said end of the robot actuator arm is effective to move an end of said outlet to any location in a swept volume as determined by the robot arm and is effective to rotate the outlet through a relatively wide range of angular movements in each of three different axes of rotation.

3. The invention defined in claim 1 wherein the actuator means comprise a three dimensional cam surface and a cam follower operatively associated with the articulated joint for producing the movment of the articulated joint.

4. The invention defined in claim 1 wherein the actuator means comprise rotary stage means and X-Y stage means for producing said movement of the articulated joint.

5. The invention defined in claim 2 wherein the articulated joint is a wrist joint in a beam delivery system associated with a robot and the beam delivery system includes an elbow joint, a telescoping tube connected between the elebow joint and the wrist joint, a fixed pedestal for supporting the elbow joint, a laser for generating the light beam, and optics for conducting the light beam from the laser to the elbow joint.

6. The invention defined in claim 1 wherein the light beam is a laser light beam.

7. The invention in claim 1 wherein the first turning mirror is mounted in a first mirror block and the second turning mirror is mounted in a second mirror block.

8. The invention defined in claim 1 wherein the first bearing means, the second bearing means and the third bearing means each include two tapered roller bearings opposed to each other and each having an inner race and an outer race and preload means for preloading the bearings by exerting a force on the inner races which tends to squeeze the inner races together and by exerting a force on the outer races which tends to push the inner races apart.

9. The invention defined in claim 8 including a custom made spacer located between the inner races and having a thickness which gives the exact proper preload.

10. An apparatus providing movement of at least a portion of a beam delivery system and directing an outlet beam to a desired location, comprising:
   an articulated joint including an inlet for an incoming light beam, an outlet for an outgoing light beam, and mirror means comprising at least two mirrors for receiving the incoming beam from the inlet and for redirecting the outgoing beam through the outlet;
   a motion delivery device operatively associated with the articulated joint to provide motion to the articulated joint in any or all of three degrees of freedom; and
   connecting bearing means disposed between the articulated joint and the motion delivery device and adapted to allow relative rotational movement between the articulated joint and the motion delivery device.

11. The apparatus defined in claim 10, wherein the connecting bearing means includes means for compensating movement in the event of a collision between the beam delivery system and an obstacle or other significant force built up between the beam delivery system and the motion delivery system.

12. The appartus defined in claim 11, wherein the compensating movement means include coiled spring members.

13. The apparatus defined in claim 12, wherein the compensating movement means further includes at least one proximity sensor adapted to sense the collision or other significant force.

14. The apparatus defined in claim 10, wherein the connecting bearing means includes two tapered roller bearings opposed to each other and each having an inner race and an outer race and preload means for preloading the bearings by exerting a force on the inner races which tends to squeeze the inner races together and by exerting a force on the outer races which tends to push the inner races apart.

15. The apparatus defined in claim 10, wherein the mirror means includes a first turning mirror means for receiving the incoming beam through the inlet and for redirecting the incoming beam, and a second turning mirror means for receiving the redirected beam from the first turning mirror means and for redirecting the beam through the outlet.

16. The apparatus defined in claim 15, further comprising:
   a first bearing means operatively associated with the inlet and with the first turning mirror means for permitting rotation of the first turning mirror means about an axis and aligned with the axis of the inlet;
   a second bearing means operatively associated with the first turning mirror means and the second turning mirror means for permitting relative motion of the first turning mirror means with respect to the second turning mirror means about an axis aligned with the direction of the beam as redirected from the first turning mirror means to the second turning mirror means;
   whereby the connecting bearing means is operativley associated with the second turning mirror means wherein the axis of rotation of the second turning mirror means is parallel to the outgoing beam at the outlet.

17. The apparatus defined in claim 16, wherein the articulated joint is a wrist joint is a beam delivery system operatively associated with the motion delivery device and the beam delivery system includes an elbow joint, a telescoping tube connected between the elbow joint and the wrist joint, a fixed pedestal for supporting the elbow joint, a laser for generating the light beam, and optics for conducting the light beam from the laser to the elbow joint.

18. The apparatus defined in claim 17, wherein the motion delivery device is a robot including an actuator arm of the robot operatively associated with the connecting bearing means to effectively move an end of the outlet to any location in a swept revolution as determined by the robot arm and is effective to rotate the outlet through a relatively wide range of angular movements in each of three different axes of rotation.

19. The invention defined in claim 17, wherein the motion delivery device is a three dimensional cam surface and a cam follower operatively associated with the third bearing means for producing movement of the articulated joint.

20. The invention defined in claim 17, wherein the motion delivery device is a rotary stage means and X-Y stage means for producing movements of the articulated joint.

21. A precision bearing unit for permitting rotation of a beam redirecting mirror about an axis aligned with the axis of rotation of the bearing unit with a minimum amount of error of angular displacement of the redirected beam, said precision bearing unit comprising,
   two tapered roller bearings opposed to each other and each having an inner race and an outer race,
   preload means for preloading the bearings by exerting a force on the inner races which tends to squeeze the inner races together and by exerting a force on the outer races which tends to push the inner races apart, and
   a custom made spacer located between the inner races and having a thickness which gives the exact proper preload.

22. A method of permitting rotation of a beam redirecting mirror about an axis aligned with the axis of rotation of a bearing unit while producing a minimum amount of error of angular displacement of the redirected beam, said method comprising,
   mounting two tapered roller bearings in opposition to each other so that the inner race of one tapered roller bearing is opposed to the inenr race of the other tapered roller bearing and so that the outer race of one tapered roller bearing is opposed to the outer race of the other tapered roller bearing, preloading the bearings by exerting a force on the inner races which tends to squeeze the inner races together and by exerting a force on the outer races which tends to push the inner races apart, locating the two tapered roller bearings axially close together in a small housing to give high rigidity to the bearing unit, determining the exact proper preload required to eliminate the play between the bearings without producing a bearing unit which is too tight, custom making a spacer having the thickness required to give the exact proper preload, and assembling the bearings with the spacer between the opposed inner races so that the thickness of the inner spacer produces the exact proper preload.

23. A method of redirecting a light beam through an articulated joint using only two turning mirrors while permitting redirection of the redirected light beam in three degrees of freedom of motion, said method comprising, conducting an incoming beam into the articulated joint through an inlet, conducting an outgoing light beam through an outlet from the articulated joint, operatively associating bearing means with the inlet and the outlet to permit three degrees of freedom of mechanical movement of the outlet with respect to the inlet, operatively associating only two turning mirrors with the bearing means for receiving the incoming beam from the outlet and for redirecting the outgoing beam through the outlet, and moving the outlet through any or all of three degrees of mechanical movement by an actuator operatively associated with a bearing means located between the actuator and the second turning mirror.

* * * * *